DESIGN.

J. NONNENBACHER.

Picture-Frames, &c.

No. 5,987. Reissued July 28, 1874.

Witnesses.

Arthur Neill

John Dugle Jr

Inventor.

John Nonnenbacher

UNITED STATES PATENT OFFICE.

JOHN NONNENBACHER, OF NEW YORK, N. Y.

BEST AVAILABLE COPY

DESIGN FOR MOLDING FOR PICTURE-FRAMES, &c.

Specification forming part of Design No. 6,995, dated November 11, 1873; reissue No. 5,987, dated July 28, 1874; application filed May 1, 1874.

*To all whom it may concern:*

Figure 1:
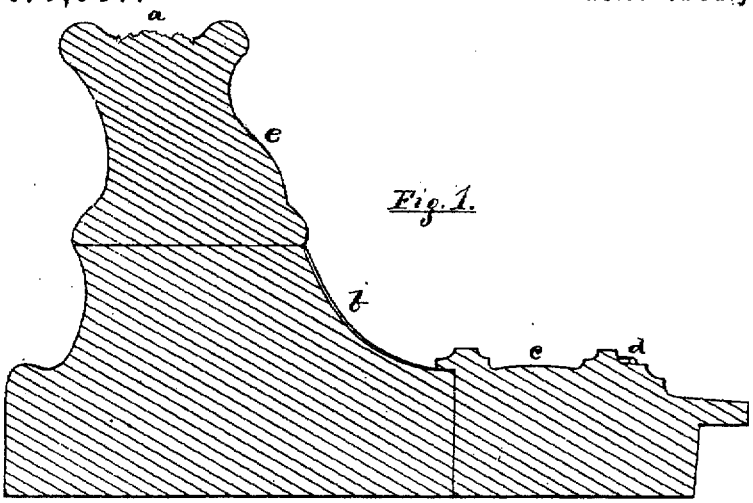

Be it known that I, JOHN NONNENBACHER, of the city, county, and State of New York, have invented a Design for Molding to be used for Picture and Mirror Frames, Cornices, &c., of which the following is a specification:

The nature of my design is fully illustrated in Figure 1 of the accompanying drawing, which represents a cross-section giving the outline form thereof, to which reference is made.

*a* represents a portion of the molding projecting well forward. *b* represents a recess or concaved portion of the molding. *c* represents a slightly-convex portion of the molding. *d* represents a raised member or section of the molding composed of different faces. *e* represents an ogee member or section of the molding.

The other parts of the molding are clearly defined in Fig. 1 of the said drawing, which represents the design as a whole, and which may be varied in some of its minor and unimportant details without substantially changing the design or altering its general effect, when viewed at a little distance.

Figure 2:
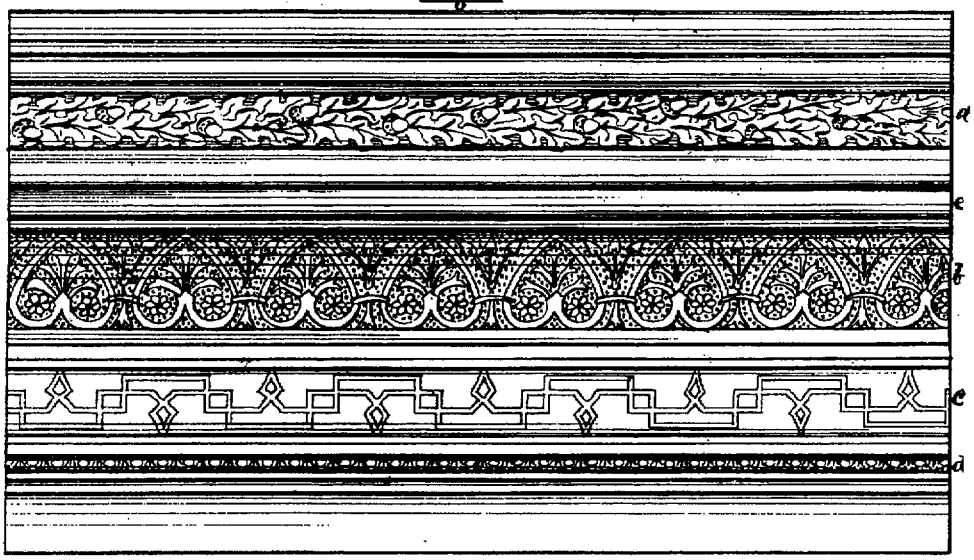

Fig. 2 represents a face elevation of my said design for a molding with its members variously ornamented—that is to say: *a*, with a series of raised oak-leaves and acorns in gilt; *b*, with raised ornaments, as shown, also in gilt; *c*, with ornaments, as shown, flat, the ground-work being silvered over the gilt, leaving the ornaments bright in gilt; *d*, with a raised ornamentation on a flat surface, in gilt; *e*, an ogee molding, plain and silver gilt. All the remaining members or parts of the molding, as shown, are silver gilt.

The ornaments, as above described, as well as the color in gilt or otherwise, of the several parts or members, may be slightly varied or imitated without changing the character of the general design, as shown in No. 1, or the effect upon the eye of the molding when finished and ready for use, as seen from a distance at which moldings in use are usually observed.

I do not claim the several forms of molding, separately and individually considered, which have been assembled together to make up the design shown in Fig. 1, which may be composed of more or less parts or pieces of wood or other material, accordingly as the economy of manufacture may be served; but What I do claim is—

1. The design for a molding for frames, cornices, &c., as shown in Fig. 1 of the drawing.
2. The design for the face of stripe *a*, as shown.
3. The design for the face of stripe *c*, as shown.
4. The design for the entire face of the molding, as shown in Fig. 2 of the drawing.

JOHN NONNENBACHER.

Witnesses:
JONAS H. GOODMAN,
K. STINER.